United States Patent [19]
Ogawa et al.

[11] Patent Number: 5,825,521
[45] Date of Patent: Oct. 20, 1998

[54] METHOD OF DETERMINING INTER-SYMBOL INTERFERENCE IN TRANSMISSION SYSTEMS

[75] Inventors: Kinichiro Ogawa, Lower Macungie Township, Lehigh County; Yong-Kwan Park, Wescosville, both of Pa.

[73] Assignee: Lucent Technologies Inc., Murray Hill, N.J.

[21] Appl. No.: 685,641

[22] Filed: Jul. 24, 1995

[51] Int. Cl.$^6$ ................................................ H04B 10/00
[52] U.S. Cl. ........................ 359/161; 359/110; 359/179
[58] Field of Search ................................. 359/161, 173, 359/110, 174, 175, 179, 341, 337, 348; 371/5.1, 5.2

[56] References Cited

U.S. PATENT DOCUMENTS

| | | | |
|---|---|---|---|
| 5,585,954 | 12/1996 | Toga et al. ............................... | 359/158 |
| 5,617,237 | 4/1997 | Bogdan et al. .......................... | 359/180 |
| 5,677,780 | 10/1997 | Nuyts ...................................... | 359/161 |
| 5,696,707 | 12/1997 | Hentschel et al. ...................... | 359/110 |

OTHER PUBLICATIONS

"Field Demonstration of Ten–Gb/s Line–Rate Transmission on an Installed Transoceanic Submarine Lightweight Cable" written by Y. K. Park, et al. and published in IEEE Photonics Technology Letters, vol. 8, No. 3, at pp. 425–427, in Mar. 1996.

"A Field Demostration of 20–Gb/s Capacity Transmission over 360 km of Installed Standard (Non–DSF) Fiber" written by Y.K. Park, et al. and published in IEEE Photonics Technology Letters, vol. 7, No. 7, at pp. 816–818, In Jul. 1995.

Nguyen et–al, Field Demonstration of 10–Gb/s Line–Rate Transmission on an Installed Transoceanic Submarine Lightwave Cable, pp. 425–427, 1996 IEEE.

*Primary Examiner*—Rafael Bacares

[57] ABSTRACT

A method of determining Inter-Symbol Interference (ISI) in transmission systems first measures, for each of a plurality of received signal having different Signal-to-Noise (S/N) ratio, the minimum Bit-Error Rate (BER) as a function of the threshold level of a decision circuit at the system receiver. The measurements are then repeated on the system or on a simulated system where one or more segments of the transmission facility has been replaced with one or more non-ISI producing attenuators. The ISI levels for a given BER value is determined from the first and second sets of measurements. An alternate method measures minimum BER values of the system and the simulated system, as a function of the received signal power, for received signals having different S/N ratios. The ISI levels for a given BER value is then determined from these two sets of measurements.

16 Claims, 5 Drawing Sheets

METHOD OF DETERMINING INTER-SYMBOL INTERFERENCE IN TRANSMISSION SYSTEMS

FIELD OF THE INVENTION

The invention relates to a procedure for determining performance degradation in transmission systems and, more particularly, to a method of separating Inter Symbol Interference (ISI) contribution from the noise contribution to the performance degradation in transmission systems.

BACKGROUND OF THE INVENTION

In optically amplified digital transmission system, the performance degradation is mainly caused by two different reasons; 1) increase of noise and 2) increase of ISI (Inter Symbol Interference). The sources of the noise are the accumulated Amplified Spontaneous Emission noise (ASE) of the optical amplifiers and possibly Stimulated Brillouin Scattering (SBS) and Rayleigh Scattering induced noises, etc. The sources of the ISI induced pulse distortion are fiber dispersion effect, fiber nonlinear Self Phase Modulation (SPM) and, for multichannel Wave Division Multiplex (WDM) system, Cross Phase Modulation (CPM) and Four Wave Mixing (FWM) between the channels.

In order to minimize the performance degradation, it is desirable to identify the system penalty sources and their corresponding contribution to the system degradation.

SUMMARY OF THE INVENTION

In accordance with the present invention, a method is disclosed for determining the inter-symbol interference (ISI) level of a signal received over a communication facility. During a first step, for each of a first plurality of received signals having different Signal-to-Noise (S/N) ratios, a minimum bit-error rate (BER) value is determined by varying the threshold levels of a decision circuit at the receiver location, thereby forming a first group of minimum BER values. After first replacing at least one segment of the communication facility with a non-ISI producing attenuator, the measurements are then repeated for a second plurality of received signals, to obtain a second group of minimum BER values. Thereafter, the ISI level for a predetermined BER value is determined, using the first and second group of minimum BER values obtained for each of the first and second plurality of received signals, respectively, in the first and second steps.

According to an alternative method, during a first step, for each of a first plurality of received signals having different Signal-to-Noise (S/N) ratios, a threshold level of a decision circuit at which a minimum BER value occurs is determined. While maintaining the determined threshold level constant at the decision circuit, a minimum bit-error rate (BER) value is measured as a function of the power of each of the received signals, thereby forming a first group of minimum BER values. During a second step, after replacing at least one segment of the communication facility with a non-ISI producing attenuator, a second group of minimum BER values is determined by repeating the procedures of the first step. Thereafter, the ISI level is determined for a predetermined minimum BER value using the first and second group of minimum BER values obtained, respectively, for each of the first and second plurality of received signals, in the first and second steps.

According to another feature of the invention, the ISI may be determined for electrical and optical signals (both analog and digital) received over electrical or optical communication facilities, respectively.

DETAILED DESCRIPTION

Figure 1:
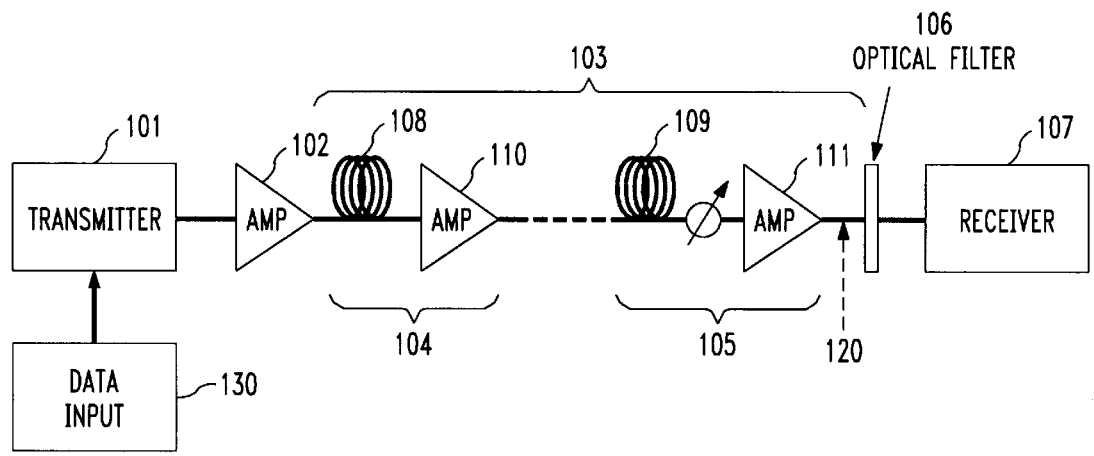
FIG. 1 shows an illustrative transmission system in which the present method may be utilized.

FIG. 1 represents a typical digital transmission system including a transmitter 101, an amplifier 102, a communication facility 103 including one or more segments 104 and 105, a band pass filter 106 and a receiver (and/or regenerator) 107. Each of the segments 104 and 105 is shown to include a facility segment 108 and 109, respectively, and an amplifier 110 and 111, respectively. Each facility segment (e.g., 108) may be a wire, a cable or an optical fiber segment. In an arrangement where the communication facility 103 includes only one segment (e.g., 104), that segment may be a passive segment (including only a wire, a cable or fiber segment, e.g., 108) or an active segment (which includes an amplifier, e.g., 110, along with the passive segment 108).

While the method of the present invention may be utilized with either analog or digital transmission systems which communicate either electrical or optical signals, for convenience purposes we describe the method of the present invention for use in an optical digital transmission system.

In an optical communication system, the communication facility 103 may include optical fiber or waveguide sections (e.g., 108) and the amplifier (e.g., 110) would be an optical amplifier. In such an arrangement the optical fiber may be any type of optical fiber including a single or multimode fiber. The optical communication system may also utilize either a single wavelength or a multiple wavelength optical signal.

If the system of FIG. 1 is a terrestrial transmission system, the Signal-to-Noise (S/N) detector 120 may be connected at the receiver 107 location of the communication facility 103 to determine system S/N levels, but may also be connected at any accessible point along the communication facility 103 to determine a S/N level for one or more segments of the system. Illustratively, the S/N detector 120 may be an optical spectrum analyzer such as HP model 70951 B.

For the remainder of this description we assume that the system of FIG. 1 is an undersea optical transmission system where the transmitter 101 and amplifier 102 are located at one terrestrial location and the amplifier 111, filter 106, receiver 107 and S/N detector 120 are located at a distant second terrestrial location. In such an undersea optical transmission system, the S/N detector 120 may only be used to obtain S/N level measurements at the receiver 107 location.

One illustrative undersea optical transmission system, of the type shown in FIG. 1, in which the method of the present invention was tested, is described in the article entitled "Field Demonstration of Ten-Gb/s Line-Rate Transmission on an Installed Transoceanic Submarine Lightweight Cable" written by Y. K. Park, et al, and published in IEEE Photonics Technology Letters, Vol. 8, No. 3, at pages 425–427, in March 1996, which is incorporated by reference herein. In that arrangement the transmitter (e.g., our 101) includes a Ti:LiNbO$_3$ modulator operating at a wavelength of 1558.5 nm. The transmitter receives a data input signal (e.g., our 130) in the form of a pseudo-random 10 Gb/s NRZ bit stream of $2^{23}-1$ length. It should be noted, however, that the data input signal may utilize any digital format. At the receiver (e.g., our 107), the optical signal is filtered by an optical filter (e.g., our 106) and detected using a p-i-n device as a detector or decision circuit (not shown in our receiver 107).

One way of measuring the performance of such an undersea optical transmission systems is to measure its BER level as a function of the threshold voltage of the decision circuit in the receiver 107. Such system performance measurements are commonly made from signal displays and are referred to as "eye-diagrams". In such systems, the limited eye margin of the back-to-back operation is attributed solely to the characteristics of the transmitter 101 and receiver 107 pair and any transmission impairment reduces the eye-margin. The main sources of this eye-margin reduction in typical optical amplifier transmission systems are the accumulated Amplified Spontaneous Emission noise (ASE) of the amplifiers (e.g., 110) and the Inter Symbol Interference (ISI) caused by the fiber (e.g., 108) dispersion and Self Phase Modulation (SPM). In order to identify the sources of performance degradation in the transmission system, the method of the present invention provides a technique to separate the ISI contribution from the ASE contribution to the performance degradation.

Once the ISI contribution is known, signal correction circuits (not shown) may be utilized at the receiver locations 106, 107, 111, and 120 and/or at the transmitter locations 101, 102, and 130 to cancel or compensate for the ISI. Optimally, the circuits can be utilized to eliminate most or all of the ISI interference so that system performance is degraded only by the ASE noise.

Figure 2:
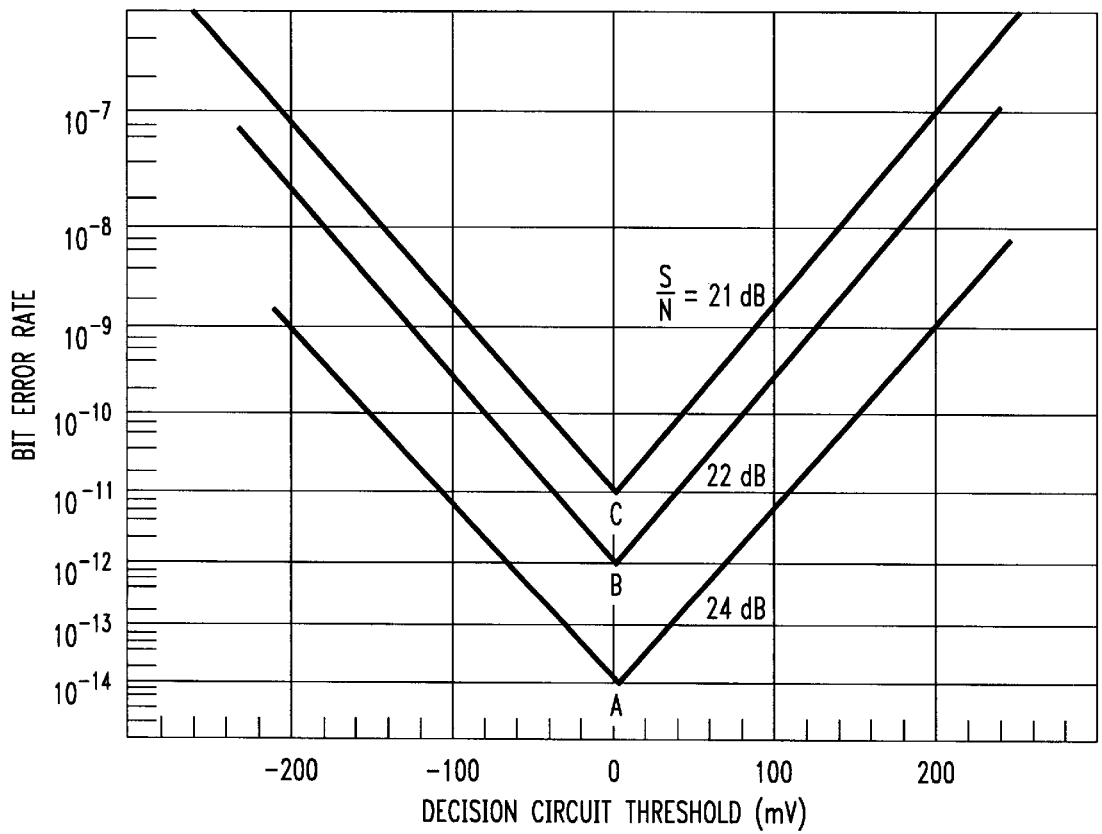
FIG. 2 shows the resulting curves of variation in Bit Error Rate (BER) values with decision circuit threshold level changes, for signals having different Signal-to-Noise (S/N) ratios in accordance with the method of the present invention.

With reference to FIG. 2, there is shown the BER value plotted against the threshold voltage of the decision circuit of receiver 107 for a plurality of signals having different S/N ratios (also referred to as levels herein). The curves shown in FIG. 2 are obtained as follows. First the level of the digital signal transmitted from transmitter 101 is adjusted to a first S/N level, e.g., 24 dB, and the BER level of the received signal is determined as a function of the decision circuit threshold level. It should be noted that the average power $\overline{P}_{in}$ into the receiver 107 is maintained at a constant value which gives the maximum eye opening for receiver 107 in back-to-back operation.

As shown, the BER level decreases with increasing threshold voltages until a minimum value A is reached, illustratively, at the 0 millivolts (mv). Thereafter, the BER level starts to increase with positive threshold voltages. This procedure is repeated, illustratively, using the S/N values of 22 and 21 dB. The minimum BER value for a signal having a S/N value of 22 dB is shown by B and also occurs at a threshold voltage of about 0 mv. Similarly, the minimum BER value for a signal having a S/N value of 21 dB is shown by C and illustratively also occurs at a 0 mv threshold voltage. It should be noted, however, that more generally the threshold voltage at which the minimum BER value is detected varies somewhat with the signal S/N values. Thus, more generally, the minimum BER values A, B and C shown in FIG. 2 would not all be located at the 0 mv threshold voltage. The threshold voltage at which the minimum BER value occurs typically depends on the operating characteristics of the transmitter 101, amplifier 102, communication facility 103, optical filter 106, amplifier 111, and/or receiver 107.

In the system shown in FIG. 1, the S/N value may be changed by adjusting the transmit signal level from transmitter 101 and/or signal level entering into the amplifier 111 at the receiving location. A lower S/N level is obtained by reducing the transmit signal level, while a higher S/N level is obtained by increasing the transmit signal level. If the system of FIG. 1 was a terrestrial system, the S/N value may also be reduced by increasing the attenuation between the amplifiers at one or more segments in the field (but such is not possible in our illustrative undersea transmission system of FIG. 1).

In FIG. 2, the points A, B and C are the minimum achievable BER values (also referred to herein as a BER floor) for signals having a S/N level of 24, 22, and 21 dB, respectively. That is, the minimal achievable BERs for the transmission system of FIG. 1 are $10^{-14}$ (point A) for S/N=24 dB, $10^{-12}$ (point B) for S/N=22 dB, and $10^{-11}$ (point C) for S/N=to 21 dB. These results are attributed to ASE noise contribution from the optical amplifiers 110 and 111 and ISI contribution from the optical fiber segments 108 and 109, as previously discussed.

Figure 3:
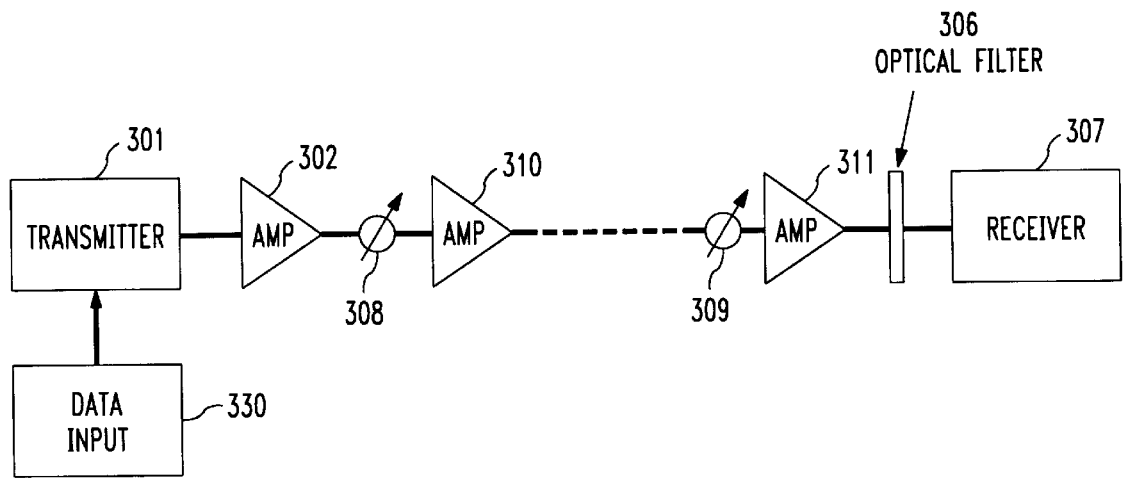
FIG. 3 shows an illustrative simulation of the transmission system of FIG. 1, where one or more segments of the communication facility have been replaced by one or more attenuators.

In accordance with the present invention, the system of FIG. 1 is simulated in FIG. 3 by substituting optical attenuators 308 and 309 for the optical fiber segments 108 and 109, respectively. This is achieved by setting the value of the optical attenuators 308 and 309 to have the same loss characteristics as that of the optical segments 108 and 109, respectively. In the system of FIG. 3, optical transmitter 301, amplifiers 302, 310, and 311, optical filter 306, and optical receiver 307 are equivalent to their respective counterparts of FIG. 1. The same type of measurements previously described for the system of FIG. 1 and shown in FIG. 2 are then repeated for the system of FIG. 3 and are shown in FIG. 4.

Figure 4:
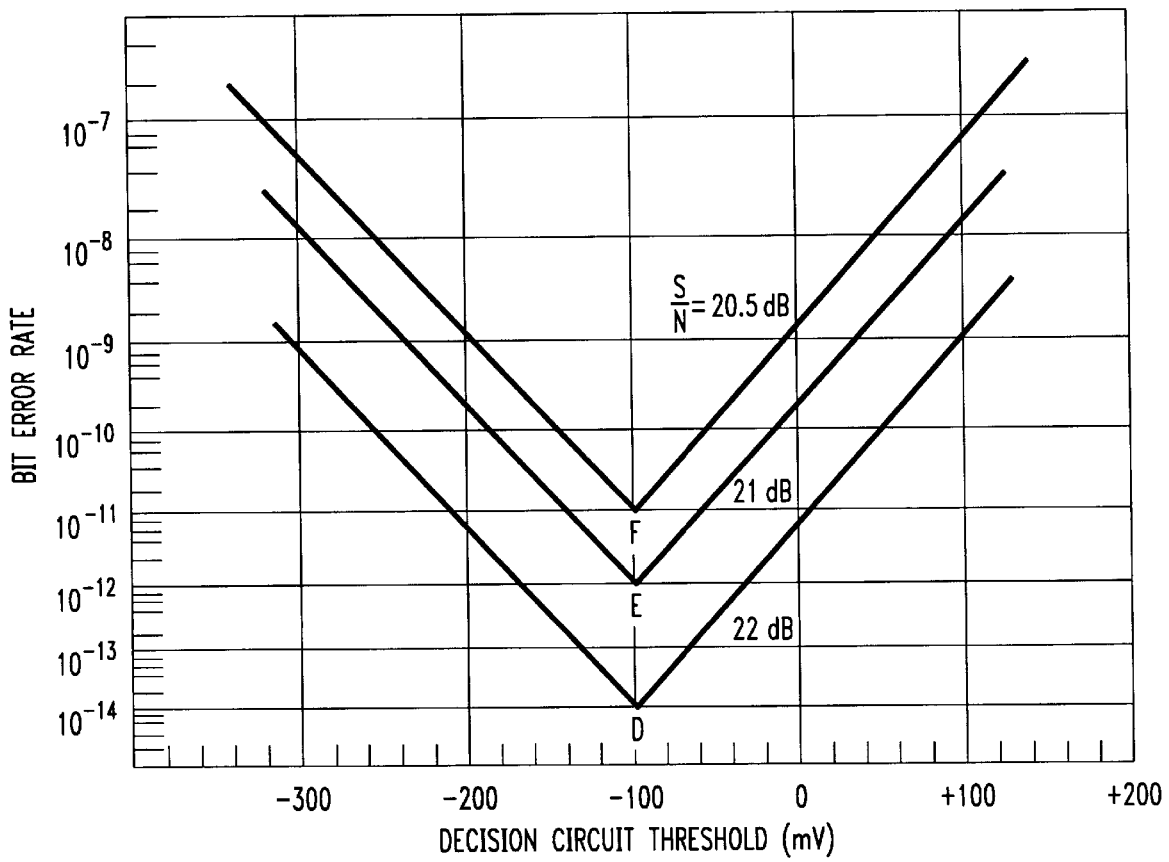
FIG. 4 shows the resulting curves depicting the variation in BER values with decision circuit threshold level changes, for signals having different S/N ratios.

In FIG. 4, the points D, E, and F correspond to the minimum achievable BER values (or BER floor) for each optical S/N level; that is $10^{-14}$ for S/N=22 dB, $10^{-12}$ for S/N=21 dB, and $10^{-11}$ for S/N=20.5 dB. While the points D, E, and F are each shown to occur at the minus 100 mv decision circuit threshold level, as discussed previously, these points D, E, and F may typically occur at somewhat different levels. Additionally, as shown, the decision circuit threshold levels (e.g., o mv) at which the points A, B, and C occur in FIG. 1, typically are not the same as the decision circuit threshold levels (e.g., -100 mv) at which the points D, E, and F occur for FIG. 3.

Since the measurements of FIG. 4 are obtained without the transmission fiber segments 108 and 109, which cause the ISI contribution (originated by the fiber dispersion and nonlinear SPM contribution etc.), the resulting distortion is the contribution solely of the optical amplifier noise (i.e., accumulated ASE noise).

Figure 5:
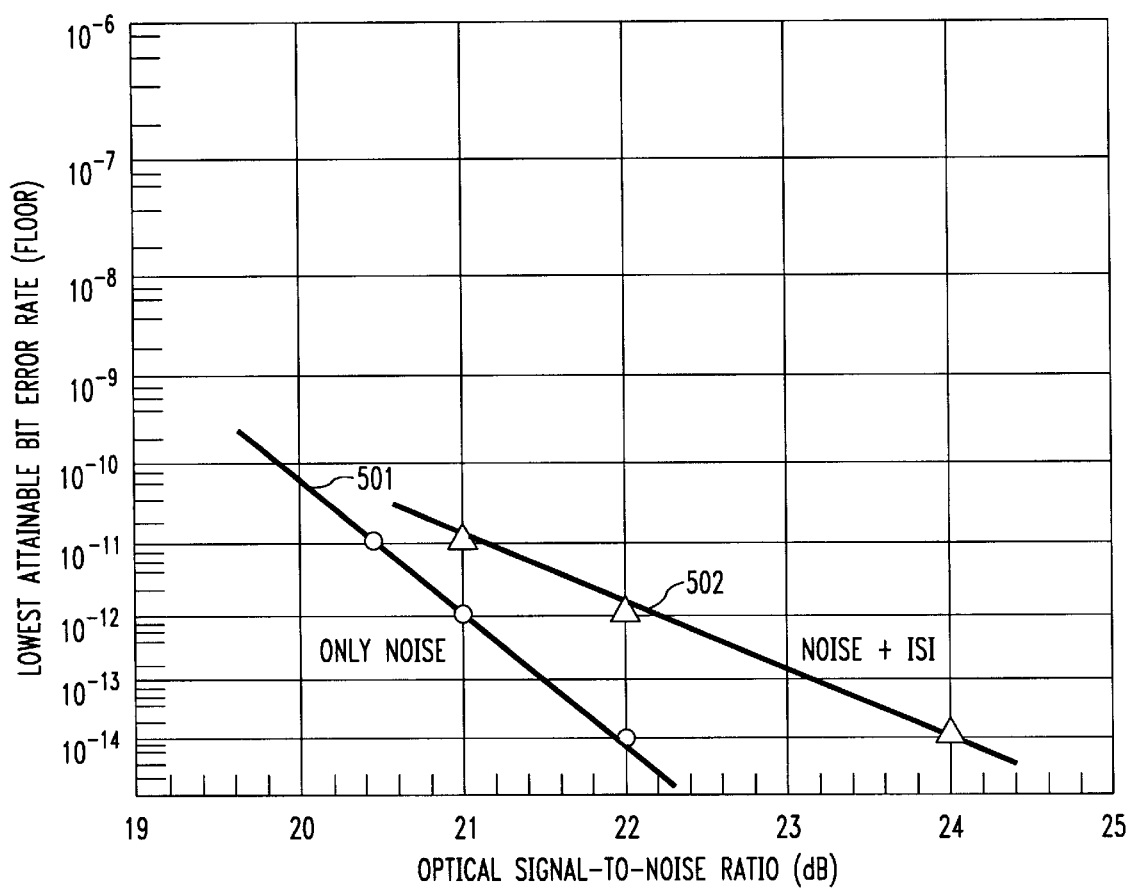
FIG. 5 shows a plot of the variations in the minimum BER values with S/N ratios as determined using data derived from the curves of FIGS. 2 and 4.

Shown in FIG. 5 is a plot of the variations in the minimum (lowest attainable) BER values with S/N ratios as determined using the data obtained from the plots of FIGS. 2 and 4. The line 501 shows the BER levels obtained from FIG. 4, that is where only ASE noise contribution of optical amplifiers (110 and 111) is considered. Thus the ISI contribution from the optical transmission fiber segments 108 and 109 have been eliminated. The line 502 shows the minimum BER levels obtained from FIG. 2 and includes the optical amplifiers (110 and 111) ASE noise contribution as well as the ISI contribution from the optical transmission fiber segments 108 and 109. While the variation in minimum BER versus optical S/N values is shown as straight lines 501 and 502 in FIG. 5, it should be noted that more generally 501 and 502 may be nonlinear curves which depend on the characteristics of the particular transmission system.

For a given minimum allowable BER value, the difference between these two curves 501 and 502 (in the horizontal direction) represents the contribution solely due to ISI interference (referred to as the ISI penalty). For example, for a BER level of $10^{-14}$ the ISI penalty corresponds to a 2 dB optical S/N ratio. With reference to FIG. 3 of the previously referenced article there is shown the results obtained with actual undersea fiber cables and clearly demonstrates the separation of the ISI contribution from the ASE noise contribution.

In accordance with another aspect with another invention, an alternate method of measuring the ISI penalty is described. This alternate method involves actually measuring the BER value of the system shown in FIG. 1 as a function of the optical power of the received signals (for a given optical S/N value) while maintaining an optimum constant threshold voltage at the receiver decision circuit. To ensure that we obtain the minimum BER value for the received signal, we first determine a threshold level of the receiver decision circuit at which a minimum BER value occurs for each of the received signals having different S/N ratios (i.e., points A, B, and C of FIG. 2). Thereafter, the threshold value for a received signal having a particular S/N ratio is then maintained at the receiver circuit while the received signal optical power is increased. The received signal optical power level can be varied without changing optical S/N ratio by adjusting the attenuator between the filter 106 and the receiver 107 in FIG. 1.

Figure 6:
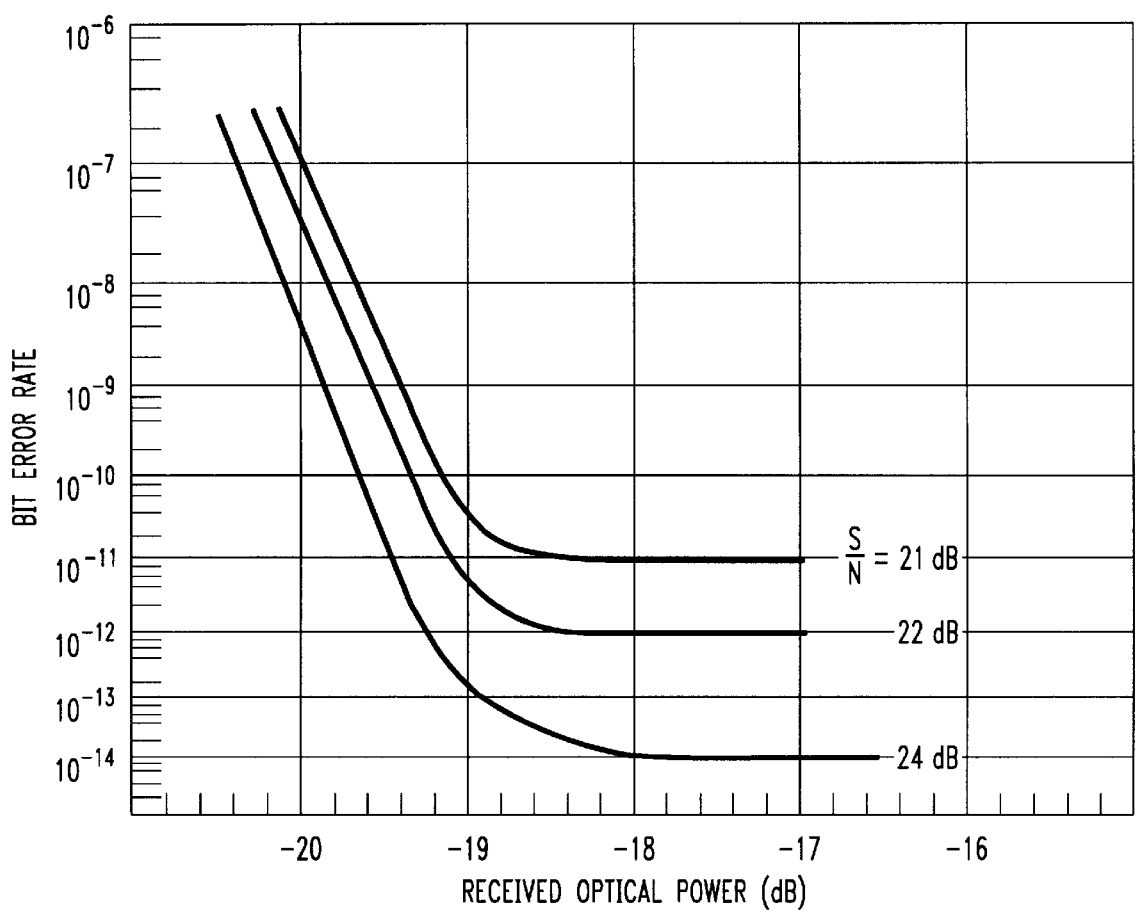
FIG. 6 shows plots obtained for the system of FIG. 1 using an alternative method of measuring the variations in BER values with received optical power, for signals having different S/N ratios.

For example, the curves shown in FIG. 6 represent the measurements of the BER versus the Received Optical Power at a threshold voltage $V_{th}=0$ mv (i.e., point A in FIG. 2) for a S/N=24 dB, and at the threshold voltage for point B for S/N=22 dB and at the threshold voltage for point C for S/N=21 dB. As shown in FIG. 6 increasing the received optical power results in each of the curves reaching a different BER floor level(or minimum value of BER). For a signal having a S/N=21 dB, the BER floor is shown to be about $10^{-11}$. For signals having a S/N=22 dB and 24 dB, the BER floor is shown to be about $10^{-12}$ and $10^{-14}$, respectively.

Thereafter, we repeat the measurements on the system shown in FIG. 3 (with attenuators substituted for the transmission fiber segments). First we determine the threshold level at which a minimum BER value occurs (i.e., points D, E, and F of FIG. 4) for signals having different S/N ratios. The BER value is then measured as a function of the received optical power, while maintaining the threshold voltage constant.

Figure 7:
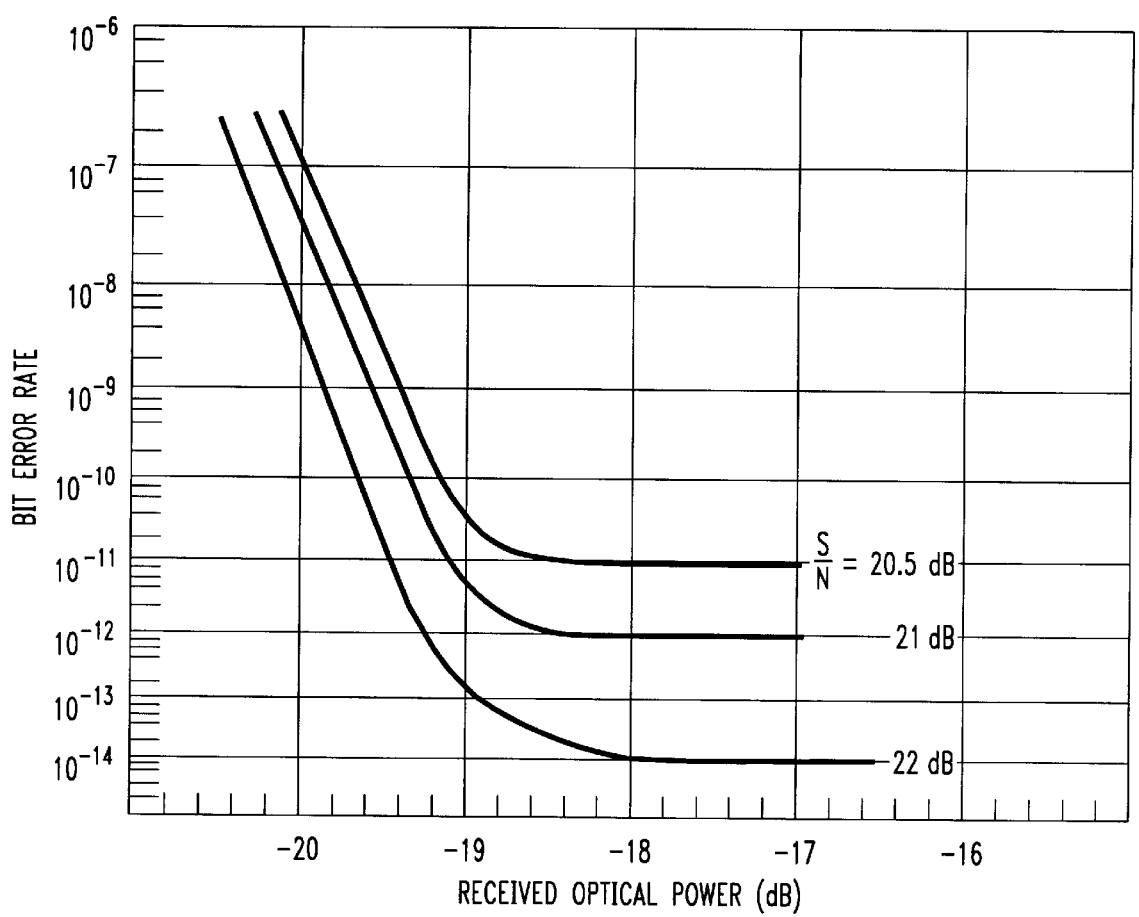
FIG. 7 shows the graphs obtained for the system of FIG. 3 using the alternative method for measuring variations in the BER values against received optical power, for signals having different S/N ratios.

With reference to FIG. 7, when we measure the BER versus the Received Optical Power at a threshold voltage $V_{th}=-100$ mv (i.e., point D in FIG. 4) for a S/N=22 dB signal, and at the threshold voltage for point E for a S/N=21 dB signal and at the threshold voltage for point F for a S/N=20.5 dB signal, we obtain the curves shown in FIG. 7. As shown in FIG. 7 increasing the received optical power results in each of the curves reaching a different BER floor level. For a signal having a S/N=20.5 dB, the BER floor is shown to be about $10^{-11}$. For signals having a S/N=21 dB and 22 dB, the BER floor is shown to be about $10^{-12}$ and $10^{-14}$, respectively.

We may then use the BER floor values determined for the different S/N values obtained in FIGS. 6 and 7 to plot the variations in the minimum BER values with received S/N ratios to obtain the diagrams 501 and 502 as shown in FIG. 5. Although the alternate procedure described above for FIGS. 6 and 7 incorporates the first step of the first procedure described above for FIGS. 2 and 4 (i.e., determining the threshold level of the receiver decision circuit at which a minimum BER value is obtained) the remaining steps are easier to accomplish than the remaining steps the first procedure. Thus while the first procedure (of FIGS. 2 and 4) involves fewer steps, it may take longer to perform than the alternate procedure (of FIGS. 6 and 7).

What has been disclosed is merely illustrative of the method of the present invention. Variations of this method can be implemented by those skilled in the art without departing from the spirit and scope of the present invention.

We claim:

1. A method of determining an inter-symbol interference, ISI, level of a signal received at a location along a communication facility, comprising the steps of:

a) for each of a first plurality of received signals having different Signal-to-Noise, S/N, ratios, determining a minimum bit-error rate, BER, value by varying threshold levels of a decision circuit connected to said location, thereby forming a first group of minimum BER values, b) after replacing at least one segment of the communication facility with a non-ISI producing attenuator, for each of a second plurality of received signals having different S/N ratios, determining a second minimum BER value by varying threshold levels of the decision circuit, thereby forming a second group of minimum BER values, and c) determining the ISI level for a predetermined BER value using the first and second groups of minimum BER values obtained in steps a) and b).

2. A method of determining an inter-symbol interference, ISI, level of a received signal at a location along the communication facility, comprising the steps of:

a) for each of a first plurality of received signals having different Signal-to-Noise, S/N, ratios, determining a threshold level of a decision circuit connected to said location at which a minimum bit-error rate, BER, value occurs, and while maintaining the determined threshold level constant at the decision circuit, measuring a minimum, BER, value as a function of the power for each of said first signals, to obtain a first group of minimum BER values, b) after replacing at least one segment of the communication facility with a non-ISI producing attenuator, repeating step a), for each of a second plurality of received signals having different S/N ratios, to obtain a second group of minimum BER values and c) determining the ISI level for a predetermined BER value using the first and second group of minimum BER values obtained in steps a) and b).

3. The method of claim 1 or 2 wherein the threshold level at which the minimum BER is determined for each received signal in steps a) is the same as for step b).

4. The method of claim 1 or 2 wherein the communication facility is an optical fiber which is part of an optical transmission system and the first signal is an optical signal.

5. The method of claim 4 wherein the optical transmission system is a multichannel Wavelength Division Multiplexed, WDM, system and the optical signal is one wavelength thereof.

6. The method of claim 1 or 2 wherein in step a) the group of minimum BER values includes noise other than Amplified-Spontaneous Emission, ASE, noise.

7. The method of claim 1 or 2 wherein the transmission system includes at least one segment having a signal amplifier and wherein the first group of minimum BER values obtained in step a) includes the effects of ASE noise from that signal amplifier.

8. The method of claim 1 or 2 wherein the predetermined BER value is a minimum BER value.

9. The method of claim 4 wherein the ISI is caused by non-linear effects in the optical fiber.

10. The method of claim 4 wherein the ISI is caused by optical dispersion effect.

11. The method of claim 5 wherein the ISI is caused by Cross-Phase Modulation, CPM.

12. The method of claim 5 wherein the ISI is caused by Four-Wave Mixing, FWM.

13. The method of claim 1 wherein the S/N ratios of the first and second plurality of received signals is the same.

14. A method of determining an inter-symbol interference, ISI, level of a signal received at a location along a communication facility, comprising the steps of:

a) for each of a first plurality of received signals having different Signal-to-Noise, S/N, ratios, determining a minimum bit-error rate, BER, value by varying threshold levels of a decision circuit connected to said location, thereby forming a first group of minimum BER values, b) after replacing at least one segment of the communication facility with a non-ISI producing attenuator, for each of a second plurality of received signals having different S/N ratios, determining a second minimum BER value by varying threshold levels of the decision circuit, thereby forming a second group of minimum BER values, and c) determining the ISI level for a Predetermined BER value using the first and second groups of minimum BER values obtained in steps a) and b) and wherein step c) includes the steps of:

plotting 1) a first line connecting at least two of the first plurality of minimum BER values and 2) a second line connecting at least two of the second plurality of minimum BER values as a function of their respective associated received signal S/N ratio, for a predetermined BER value, selecting where that predetermined BER value intersects the first and second plotted lines to obtain a first and a second S/N ratio, and subtracting the second S/N ratio from the first S/N ratio to determine an ISI value.

15. The method of claim 1 or 2 wherein the first and second plurality of received signals are the same.

16. A method of determining an inter-symbol interference, ISI, level of a digital optical signal received at a location along an optical fiber communication facility, comprising the steps of:

a) for each of a first plurality of received signals having different Signal-to-Noise, S/N, ratios, determining a minimum bit-error rate, BER, value by varying threshold levels of a decision circuit connected to said location, thereby forming a first group of minimum BER values, b) after replacing at least one segment of the optical fiber with a non-ISI producing attenuator, for each of a second plurality of received signals having different S/N ratios, determining a second minimum BER value by varying threshold levels of the decision circuit, thereby forming a second group of minimum BER values, and c) determining the ISI level for a predetermined BER value using the first and second groups of minimum BER values obtained in steps a) and b).

* * * * *